United States Patent
Smith et al.

(10) Patent No.: US 10,461,951 B2
(45) Date of Patent: Oct. 29, 2019

(54) HVAC THERMOSTAT WITH FUEL CONTROL

(71) Applicant: Trane International Inc., Davidson, NC (US)

(72) Inventors: Christopher Blake Smith, Whitehouse, TX (US); James Joseph Wiltzius, Forest Lake, MN (US)

(73) Assignee: Trane International Inc., Davidson, NC (US)

( * ) Notice: Subject to any disclaimer, the term of this patent is extended or adjusted under 35 U.S.C. 154(b) by 218 days.

(21) Appl. No.: 15/288,054

(22) Filed: Oct. 7, 2016

(65) Prior Publication Data

US 2017/0102723 A1    Apr. 13, 2017

Related U.S. Application Data

(60) Provisional application No. 62/238,237, filed on Oct. 7, 2015.

(51) Int. Cl.
*G05D 27/02* (2006.01)
*H04L 12/28* (2006.01)
(Continued)

(52) U.S. Cl.
CPC .......... *H04L 12/28* (2013.01); *H04L 12/6418* (2013.01); *F24F 11/47* (2018.01);
(Continued)

(58) Field of Classification Search
CPC .. F24F 11/47; F24F 11/52; F24F 11/56; F24F 2140/60
See application file for complete search history.

(56) References Cited

U.S. PATENT DOCUMENTS

| 4,969,508 A | 11/1990 | Tate et al. |
| 5,911,747 A | 6/1999 | Gauthier |

(Continued)

FOREIGN PATENT DOCUMENTS

| WO | 2007024622 A2 | 3/2007 |
| WO | 2007024623 A2 | 3/2007 |
| WO | 2015089116 A1 | 6/2015 |

OTHER PUBLICATIONS

"Bid Procedures"; https://www.southerncompany.com/about-us/suppliers/fuel-services/bid-procedures.html; Apr. 22, 2013.*

(Continued)

*Primary Examiner* — Jonathan Bradford
(74) *Attorney, Agent, or Firm* — The Salerno Law Firm, P.C.

(57) ABSTRACT

Improvements to an HVAC thermostat include a fuel control module that estimates a rate of fuel usage by the HVAC system and issues a warning and optionally schedules a fuel delivery or solicits a fuel delivery bid when the on-site fuel supply drops beneath a predetermined level, a nightlight module that illuminates a touchscreen in accordance with at least one nightlight parameter, and a user interface mode control module that selects for display on the touchscreen display, a primary user interface from among a plurality of potential user interfaces based at least in part upon the frequency of use of each of the plurality of potential user interfaces.

10 Claims, 18 Drawing Sheets

(51) Int. Cl.
  *H04L 12/64*   (2006.01)
  *F24F 140/60*  (2018.01)
  *F24F 11/56*   (2018.01)
  *F24F 11/52*   (2018.01)
  *F24F 11/47*   (2018.01)

(52) U.S. Cl.
  CPC ............... *F24F 11/52* (2018.01); *F24F 11/56* (2018.01); *F24F 2140/60* (2018.01); *G05B 2219/2614* (2013.01)

(56) References Cited

U.S. PATENT DOCUMENTS

| | | | |
|---|---|---|---|
| 6,157,943 | A  | 12/2000 | Meyer |
| 6,564,632 | B2 | 5/2003  | Ross, Jr. |
| 6,580,950 | B1 | 6/2003  | Johnson et al. |
| 6,637,667 | B2 | 10/2003 | Gauthier et al. |
| 6,679,116 | B2 | 1/2004  | Ross, Jr. |
| 6,990,335 | B1 | 1/2006  | Shamoon et al. |
| 7,113,086 | B2 | 9/2006  | Shorrock |
| 7,908,211 | B1 | 3/2011  | Chen et al. |
| 7,953,518 | B2 | 5/2011  | Kansal et al. |
| 7,994,928 | B2 | 8/2011  | Richmond |
| 8,024,054 | B2 | 9/2011  | Mairs et al. |
| 8,055,386 | B2 | 11/2011 | McCoy et al. |
| 8,055,387 | B2 | 11/2011 | McCoy et al. |
| 8,099,178 | B2 | 1/2012  | Mairs et al. |
| 8,160,752 | B2 | 4/2012  | Weaver et al. |
| 8,195,313 | B1 | 6/2012  | Fadell et al. |
| 8,200,700 | B2 | 6/2012  | Moore et al. |
| 8,204,795 | B2 | 6/2012  | Chen et al. |
| 8,219,249 | B2 | 7/2012  | Harrod et al. |
| 8,249,731 | B2 | 8/2012  | Tran et al. |
| 8,280,536 | B1 | 10/2012 | Fadell et al. |
| 8,332,075 | B2 | 12/2012 | Harrod et al. |
| 8,347,088 | B2 | 1/2013  | Moore et al. |
| 8,489,243 | B2 | 7/2013  | Fadell et al. |
| 8,560,127 | B2 | 10/2013 | Leen et al. |
| 8,583,843 | B2 | 11/2013 | Rosso |
| 8,706,270 | B2 | 4/2014  | Fadell et al. |
| 8,761,712 | B1 | 6/2014  | Howard |
| 8,793,022 | B2 | 7/2014  | Uden |
| 8,955,337 | B2 | 2/2015  | Parish et al. |
| 9,007,222 | B2 | 4/2015  | Mittleman et al. |
| 2002/0016639 | A1 | 2/2002 | Smith et al. |
| 2003/0050737 | A1 | 3/2003 | Osann |
| 2005/0090915 | A1 | 4/2005 | Geiwitz |
| 2005/0247123 | A1* | 11/2005 | Fuse .................. G01F 15/0755 73/290 R |
| 2006/0130500 | A1 | 6/2006 | Gauthier et al. |
| 2006/0265489 | A1 | 11/2006 | Moore |
| 2007/0053513 | A1 | 3/2007 | Hoffberg |
| 2007/0055757 | A1 | 3/2007 | Mairs et al. |
| 2007/0055758 | A1 | 3/2007 | McCoy et al. |
| 2007/0055759 | A1 | 3/2007 | McCoy et al. |
| 2007/0061266 | A1 | 3/2007 | Moore et al. |
| 2007/0061487 | A1 | 3/2007 | Moore et al. |
| 2007/0067062 | A1 | 3/2007 | Mairs et al. |
| 2007/0100666 | A1 | 5/2007 | Stivoric et al. |
| 2009/0001181 | A1* | 1/2009 | Siddaramanna ........ F23N 5/203 236/46 R |
| 2010/0036560 | A1 | 2/2010 | Wright et al. |
| 2010/0070086 | A1 | 3/2010 | Harrod et al. |
| 2010/0070089 | A1 | 3/2010 | Harrod et al. |
| 2010/0070093 | A1 | 3/2010 | Harrod et al. |
| 2011/0106996 | A1 | 5/2011 | Rosso |
| 2011/0138024 | A1 | 6/2011 | Chen et al. |
| 2011/0213502 | A1 | 9/2011 | Uden |
| 2012/0000207 | A1 | 1/2012 | Parish et al. |
| 2012/0029725 | A1* | 2/2012 | Lafleur ............... G05D 23/1924 700/300 |
| 2012/0094638 | A1 | 4/2012 | Shamoon et al. |
| 2012/0130547 | A1 | 5/2012 | Fadell et al. |
| 2012/0158203 | A1 | 6/2012 | Feldstein |
| 2012/0232969 | A1 | 9/2012 | Fadell et al. |
| 2012/0239207 | A1 | 9/2012 | Fadell et al. |
| 2012/0253523 | A1 | 10/2012 | Harrod et al. |
| 2012/0310418 | A1 | 12/2012 | Harrod et al. |
| 2013/0029595 | A1 | 1/2013 | Widmer et al. |
| 2013/0046397 | A1 | 2/2013 | Fadell et al. |
| 2013/0066472 | A1 | 3/2013 | Harrod et al. |
| 2013/0091209 | A1 | 4/2013 | Bennett et al. |
| 2013/0091213 | A1 | 4/2013 | Diab et al. |
| 2013/0104251 | A1 | 4/2013 | Moore et al. |
| 2013/0173064 | A1 | 7/2013 | Fadell et al. |
| 2013/0201316 | A1 | 8/2013 | Binder et al. |
| 2014/0005837 | A1 | 1/2014 | Fadell et al. |
| 2014/0045482 | A1 | 2/2014 | Bisson et al. |
| 2014/0052300 | A1 | 2/2014 | Matsuoka et al. |
| 2014/0084165 | A1 | 3/2014 | Fadell et al. |
| 2014/0085092 | A1 | 3/2014 | Fadell et al. |
| 2014/0085093 | A1 | 3/2014 | Mittleman et al. |
| 2014/0200719 | A1 | 7/2014 | Fadell et al. |
| 2014/0200739 | A1 | 7/2014 | Kirsch |
| 2014/0211099 | A1 | 7/2014 | Saha et al. |
| 2014/0222220 | A1 | 8/2014 | Fadell et al. |
| 2014/0266669 | A1 | 9/2014 | Fadell et al. |
| 2014/0269660 | A1 | 9/2014 | Dunn et al. |
| 2014/0277765 | A1 | 9/2014 | Karimi et al. |
| 2014/0371923 | A1 | 12/2014 | Weaver et al. |
| 2015/0096170 | A1 | 4/2015 | Mittleman et al. |
| 2015/0096876 | A1 | 4/2015 | Mittleman et al. |
| 2015/0100167 | A1 | 4/2015 | Sloo et al. |
| 2015/0140994 | A1 | 5/2015 | Partheesh et al. |
| 2015/0159895 | A1 | 6/2015 | Quam et al. |
| 2015/0163631 | A1 | 6/2015 | Quam et al. |
| 2015/0228419 | A1 | 8/2015 | Fadell et al. |

OTHER PUBLICATIONS

"Guidelines on Preparing Engineer's Estimate, Bid Reviews and Evaluation"; https://www.fhwa.dot.gov/programadmin/contracts/ta508046.cfm; Jan. 20, 2004.*

* cited by examiner

HVAC THERMOSTAT WITH FUEL CONTROL

CROSS-REFERENCE TO RELATED APPLICATION

This application claims the benefit of and priority to U.S. Provisional Application Ser. No. 62/238,237 entitled "IMPROVED HVAC THERMOSTAT" and filed Oct. 7, 2015, the entirety of which is hereby incorporated by reference herein for all purposes.

BACKGROUND

1. Technical Field

The present disclosure is directed to an HVAC thermostat, and in particular, to an improved HVAC thermostat that provides fuel level data, home automation and media control interfaces, and nightlight capabilities.

2. Background of Related Art

It is well-known that heating, ventilation, and air conditioning (HVAC) systems are typically controlled by a thermostat that is mounted on a wall and enables occupants to set the desired temperature in the building. In summer months, the thermostat can be placed in a cooling mode to operate air conditioning equipment, while in the winter months the thermostat can be placed in a heating mode to operate an oil- or gas-fired furnace, an electric heater, or a heat pump.

Thermostats range in complexity from basic electromechanical round dial models that employ bimetallic strips and mercury switches, to computerized devices which employ a range of sensor and touch screen technologies to provide convenience features such as heating/cooling profiles which control temperature based on a schedule, building occupancy, and other criteria. More recently, advanced thermostats have introduced remote control capability and the ability to integrate with entertainment, security, and home automation systems.

Such advanced thermostats may have drawbacks. As more and more features are added, the user may become overwhelmed by the available options and configuration settings. For example, it may be confusing and inconvenient for a typical user to find and use settings which reside within many layers of menu options. Often, the burden of learning and navigating the plethora of options presented to the user outweighs the benefits provided.

In addition, many homeowners have heating systems that rely on periodic fuel deliveries to an on-site tank, such as heating oil or liquid propane (LP) fueled heating systems. Such systems typically have very archaic methods of tracking how much fuel is left for heating. For example, a homeowner may measure oil level with a long ruler inserted into a tank ("sticking" the tank) or physically observing a level of a fuel gauge at the tank, either of which can be inconvenient when an outdoor tank is used and the weather is cold and harsh. Remote level sensing systems are available, however these can be expensive and unreliable. Consequently, homeowners have a choice of either contracting with an expensive fuel company that automatically makes deliveries, or, purchasing fuel from a cheaper company (e.g., "spot oil") that places the burden on the homeowner to monitor fuel usage and schedule fuel deliveries. If the homeowner is not careful, the heating system will run out of fuel, which can be disastrous.

A thermostat which addresses the above shortcomings and provides useful, improved features in an efficient and easy-to-use manner would be a welcome advance.

SUMMARY

In one aspect, the present disclosure is directed to an improved HVAC thermostat for an HVAC system having an on-site fuel supply. The improved thermostat includes a touchscreen display and a fuel control module configured for estimating a rate of fuel usage by the HVAC system and for issuing an alert when the on-site fuel supply drops below a predetermined level.

In some embodiments, the fuel control module estimates a rate of fuel usage by performing a fuel calibration cycle to determine a fuel calibration constant. In some embodiments, the fuel calibration constant is the amount fuel used per unit of run time and/or the amount fuel used per heating degree day. In some embodiments, the fuel control module is further configured for transmitting a fuel delivery request when the on-site fuel supply drops below a predetermined level. In some embodiments, the fuel control module is further configured to receive a user input, and/or a fuel delivery message from a fuel delivery provider, that indicates a quantity of fuel added to the on-site fuel supply. In some embodiments, the touchscreen display includes a fuel gauge indicative of a fuel level of the on-site fuel supply.

In some embodiments, the fuel control module is further configured for transmitting a fuel delivery bid request to an online marketplace when the on-site fuel supply drops beneath a predetermined level; receiving at least one fuel delivery bid from a fuel delivery provider; selecting a winning bid from among the at least one fuel delivery bid; and transmitting a fuel delivery request to the fuel delivery provider corresponding to the winning bid. In some embodiments, the fuel delivery bid may include an offer term such as, without limitation, a fuel price, a delivery time window, and/or a discount rate.

In another aspect, the present disclosure is directed to an improved HVAC thermostat. The thermostat includes a sensor, such as, without limitation, an ambient light detector and/or a proximity sensor; an illuminated touchscreen display; and a nightlight module. The nightlight module is configured to illuminate the touchscreen in accordance with at least one nightlight parameter, such as, without limitation, an activation event, a deactivation event, an illumination intensity, and an illumination color.

In some embodiments, the activation event includes activation of a sleep mode, reaching a scheduled start time, detection of ambient light by the ambient light sensor falling below a predetermined level, and/or the detection of an object by the proximity sensor. In some embodiments, the scheduled start time is determined at least in part with respect to the time of sunset. In some embodiments, the thermostat includes an auxiliary nightlight connector that is configured for selective engagement with an auxiliary nightlight module. In these embodiments, the nightlight module is further configured to illuminate the auxiliary nightlight module in accordance with the nightlight parameters. In some embodiments, the deactivation event includes activation of a non-sleep mode, reaching a scheduled end time, detection of ambient light by the ambient light sensor rising above a predetermined level, and/or the detection of no object by the proximity sensor.

In yet another aspect, the present disclosure is directed to an improved HVAC thermostat having a touchscreen display and a mode control module. The mode control module includes a selector which selects, for display on the touchscreen display, a primary user interface from among a plurality of potential user interfaces based at least in part upon the frequency of use of each of the plurality of potential user interfaces.

In some embodiments, the mode control module selects at least one secondary user interface from among a plurality of potential user interfaces based at least in part upon the frequency of use of each of the plurality of potential user interfaces, and/or a user selection. In some embodiments, the plurality of potential user interfaces may include an HVAC mode user interface, a media mode user interface, a home automation mode user interface, and/or a security mode user interface. In some embodiments, the mode control module is further configured to select from among a plurality of potential user interfaces, for display on the touchscreen display, in response to a swipe gesture performed on the touchscreen display.

In still another aspect, the present disclosure is directed to non-transitory computer-readable media, which, when executed on a processor included in a thermostat, cause the thermostat to perform any one, some, or all of the processes substantially as described herein.

BRIEF DESCRIPTION OF THE DRAWINGS

Various embodiments of the disclosed system and method are described herein with reference to the drawings wherein.

Figure 1:
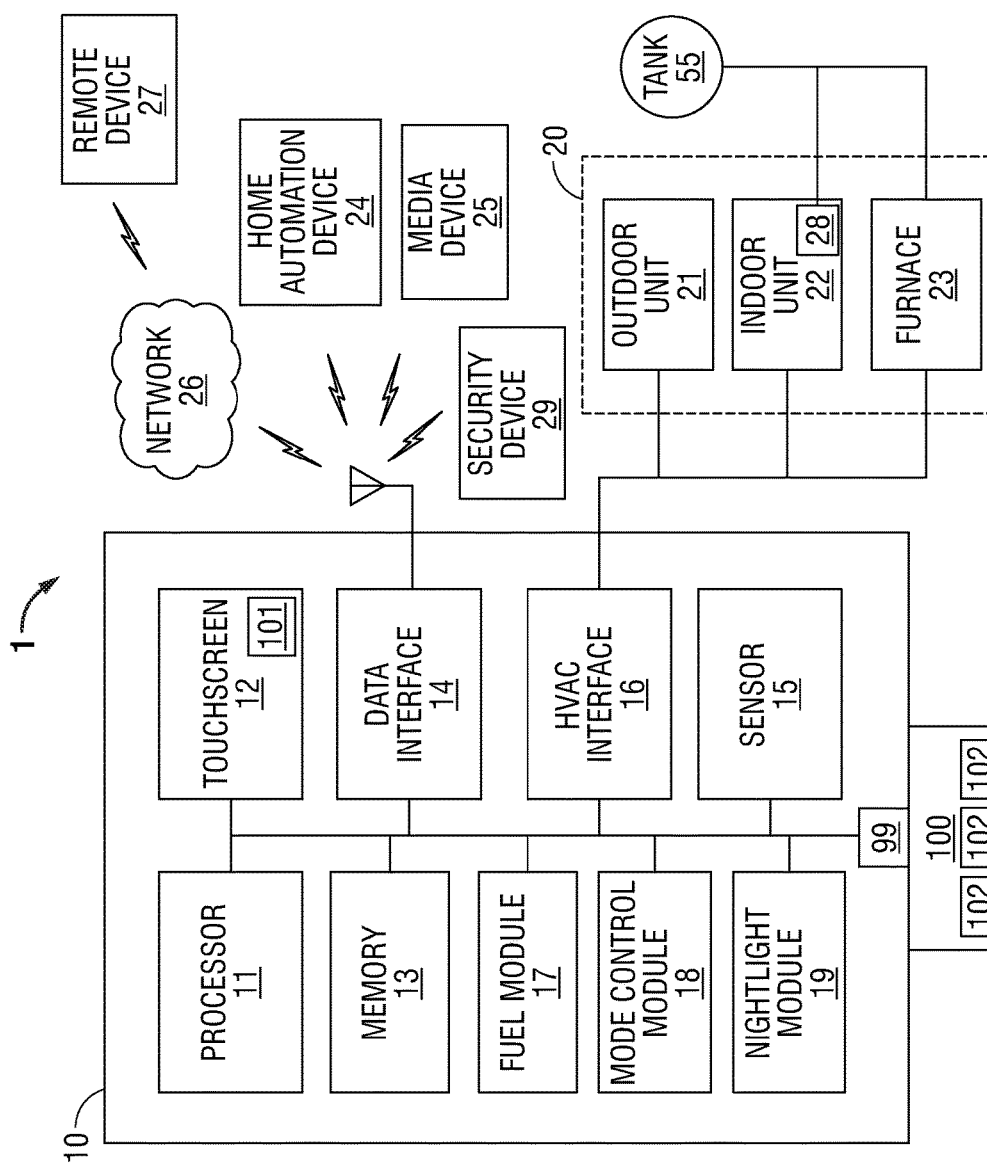
FIG. 1 is a block diagram of an embodiment of an HVAC system having an improved thermostat in accordance with the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in any appropriately detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. It should be appreciated that the particular implementations described herein are illustrative of the disclosure and its best mode and are not intended to otherwise limit the scope of the present disclosure in any way. One skilled in the art will also appreciate that, for security reasons, any element of the present disclosure may consist of any combination of databases or components at a single location or at multiple locations, wherein each database or system includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

In one aspect, the present disclosure is directed to an improved HVAC thermostat and related systems and methods that estimate how much fuel has been used, and displays fuel use to the homeowner. The thermostat includes a fuel module that employs a calibration procedure which enables the thermostat the learn the fuel consumption characteristics of a fuel-consuming HVAC unit, such as a furnace or auxiliary heater, and computes fuel use based on run time. In embodiments, the disclosed thermostat may additionally or alternatively determine fuel usage in accordance with a degree day calculation using outdoor temperature data received from an outdoor temperature sensor and/or a weather data provider such as the National Oceanic and Atmospheric Administration (NOAA). Embodiments are disclosed which transmit an alert to the homeowner when fuel supplies are low, and which may transmit a delivery request to a fuel provider to schedule a fill-up. In embodiments, a fuel bid request may be transmitted by the thermostat to a heating fuel marketplace. The heating fuel marketplace consists of one or more heating fuel providers that respond to a bid request with a current offer price, and delivery window. The fuel module selects the fuel provider offering the most attractive terms (e.g., best price, quickest delivery, etc.) and schedules a fuel delivery at the bid terms with the winning fuel provider.

The disclosed thermostat may be advantageous to those homeowners with heating systems that rely on periodic fuel deliveries to an on-site tank. The disclosed thermostat enables a homeowner to purchase heating fuel at lower costs, relieves the homeowner of the burden of monitoring fuel use, eliminates the need for costly and troublesome fuel level sensing systems, and effectively eliminates the risk of running out of fuel.

In another aspect, the present disclosure is directed to a configurable thermostat having distinct operating or "feature" modes wherein the home screen is programmed to switch roles based upon a desired predefined operating mode. In example embodiments, the thermostat may be placed into an HVAC mode, a Home Automation mode, a Media mode, and/or a Security mode. In the HVAC mode, the home screen enables control of temperature and other settings relevant to a programmable thermostat. In the Home Automation mode, the home screen enables control of home automation devices in the home. In the Media Mode, the home screen enables control of music and video playback throughout the home. In the Security mode, the home screen allows the homeowner to control and monitor security zones throughout the home, such as arming or disarming intrusion detection, control and review of surveillance video and audio, and so forth. By dynamically tailoring the user interface to add the most frequently-used controls for selected mode in the home screen, embodiments of the present disclosure provides the homeowner with a more pleasing and efficient means to interface with domestic technology.

In yet another aspect, the present disclosure is directed to an improved thermostat having a nightlight mode. In embodiments, the nightlight is configurable to enable the homeowner to specify the intensity, color, and schedule for illuminating the thermostat's display. The display may include a backlit transmissive display (e.g., LCD) or an emissive display (e.g., OLED, plasma). In embodiments, a nightlight display screen may be defined, for example, as a security camera view of the front door, a baby monitor camera view, a favorite photograph, a pattern, or a uniform color. In embodiments, the nightlight mode may be based upon an ambient light sensor and/or the times of sunset and sunrise computed from the home's geographic location (latitude, longitude).

In more detail, and with reference to FIG. 1, an example embodiment of am HVAC system 1 having an improved thermostat 10 is shown. Thermostat 10 includes, in operative communication, processor 11, touchscreen 12, memory 13, data interface 14, one or more sensors 15, and HVAC interface 16. Sensor 15 may include a temperature sensor, humidity sensor, light sensor, proximity sensor and/or a motion sensor. HVAC interface 16 is configured to communicatively couple thermostat 10 with HVAC equipment 20. HVAC equipment 20 may include, without limitation, an outdoor unit 21, an indoor unit 22, and/or a furnace 23. Data interface 14 is configured to communicably couple thermostat 10 with other devices, including without limitation a home automation device 24, a media device 25, a security device 29, and/or a remote device 27.

Data interface 14 may be configured to communicate using any suitable wireless communication protocol, such as without limitation, any variant of IEEE 802.11 (commonly known as WiFi), variants of IEEE 802.15 wireless personal area networking such as Bluetooth® and ZigBee®, and other wireless standards such as Z-Wave®. Data interface 14 may be additionally or alternatively be configured to communicate using a wired protocol using dedicated data lines (e.g., Ethernet) or via powerline communication links using, for example, IEEE 1901, X10® and/or Insteon® protocol.

Data interface 14 may be additionally or alternatively be configured to communicate using a cellular mobile network using, for example and without limitation, a GSM protocol (3G, 4G, LTE etc.), a CDMA protocol (EV-DO, SV-DO, etc.), and so forth. In embodiments, data interface 14 is configured to act as a WiFi hot-spot or wired router to enable thermostat 10 to provide internet access via the cellular data network to other internet-enabled devices within the home, such as computers, notebooks, mobile devices, streaming media devices, security devices, appliances, and so forth.

As will be appreciated by the person of ordinary skill in the art, home automation device 24 includes any of a variety of devices used to control home appliances and features, such as, such as remote-controlled outlets, lighting dimmers and scene controllers, window shades, skylights, irrigation systems, swimming pools and spas, and so forth. Media device 25 may include any device configured to play audio or video, for example, a media server, Bluetooth® speaker, and/or a music playback device such as the CONNECT and PLAY series of devices manufactured by Sonos Inc. of Santa Barbara, Calif., US. Security device 29 may include any device used for security or surveillance, such as an alarm sensor, alarm panel, network video recorder (NVR), IP camera, and so forth.

HVAC interface 16 may be configured to communicate between thermostat 10 and HVAC equipment 20 using any communications protocol suitable for use with HVAC equipment 20. For example, and without limitation, where indoor unit 21, outdoor unit 22, and/or furnace 23 employ single- or dual-speed motors, HVAC interface 16 may include a 24V switched circuit interface which operates with well-known HVAC color-coded wiring schemes (Re, Rh, C, Y, W, Y2, W2, G, E, O, V, etc.). Where indoor unit 21 and/or outdoor unit 22 employ variable-speed motors, HVAC interface 16 may include a digital signaling interface such as, without limitation, CAN bus, RS-485, ComfortLink II™, ClimateTalk™, and the like. In embodiments, HVAC interface 16 may operate using both 24V switched circuits and digital signaling protocols to flexibly accommodate any combination of HVAC equipment. In embodiments, any of the functions of data interface 14 may be performed by HVAC interface 16, and vice versa. In embodiments, HVAC interface 16 may be incorporated within data interface 14.

Thermostat 10 is configured for communication with one or more remote devices 27 via network 26 (which may include a LAN and/or the public internet). Remote device 27 may include, without limitation, a mobile device (smart phone, tablet computer, and the like) and/or a remote server (such as a dealer diagnostic portal, a fuel marketplace server, a weather data provider, other data providers, and so forth).

In some embodiments, outdoor unit 21 and indoor unit 22 may be configured as a split HVAC system wherein outdoor unit 21 is configured as an air conditioner or heat pump unit, and indoor unit 22 is configured as an air handling unit. In other embodiments, outdoor unit 21 and indoor unit 22 may be included within a common enclosure. In some embodiments, outdoor unit 21 and/or indoor unit 22 may include an auxiliary heater 28 for use when a heat pump alone is insufficient to meet the heating demand of the home. HVAC equipment 20 may include a furnace 23 configured for heating the home via combustion of heating oil (typically, No. 2 heating oil), liquid propane (LP), or other fuel such as liquefied natural gas (LNG), that is stored on-site in fuel tank 55. Such fuels are typically delivered via truck delivery to the on-site tank.

Thermostat 10 includes fuel module 17, mode control module 18, and nightlight module 19 in which are embodied the fuel monitoring, mode control, and nightlight aspects of the present disclosure described herein. As will be appreciated by one of ordinary skill in the art, aspects of the present disclosure, including but not limited to fuel module 17, mode control module 18, and nightlight module 19, may take the form of an entirely software embodiment, an entirely hardware embodiment, or an embodiment combining both software and hardware. Embodiments may take the form of a computer program product on any suitable non-transitory computer-readable storage medium having computer-readable program code embodied in the storage medium. Any suitable computer-readable storage medium may be utilized, including semiconductor storage devices, e.g., mask ROM, EEPROM, flash memory, USB thumb drives, and the like. Computer program instructions embodying the present disclosure may be stored in a computer-readable memory that can direct a computer or other programmable data processing apparatus to function in a particular manner, such that the instructions stored in the computer-readable memory produce an article of manufacture, including instruction means, that implement the functions described herein.

Figure 2:
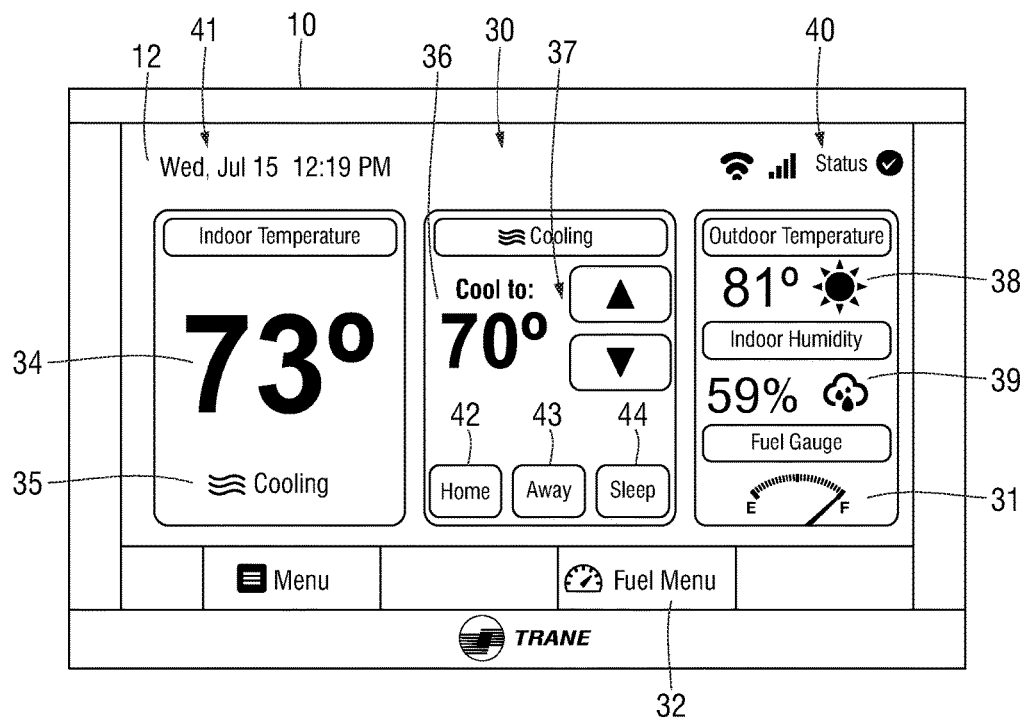
FIG. 2 illustrates an improved thermostat having a fuel gauge display in accordance with the present disclosure.
Figure 2A:
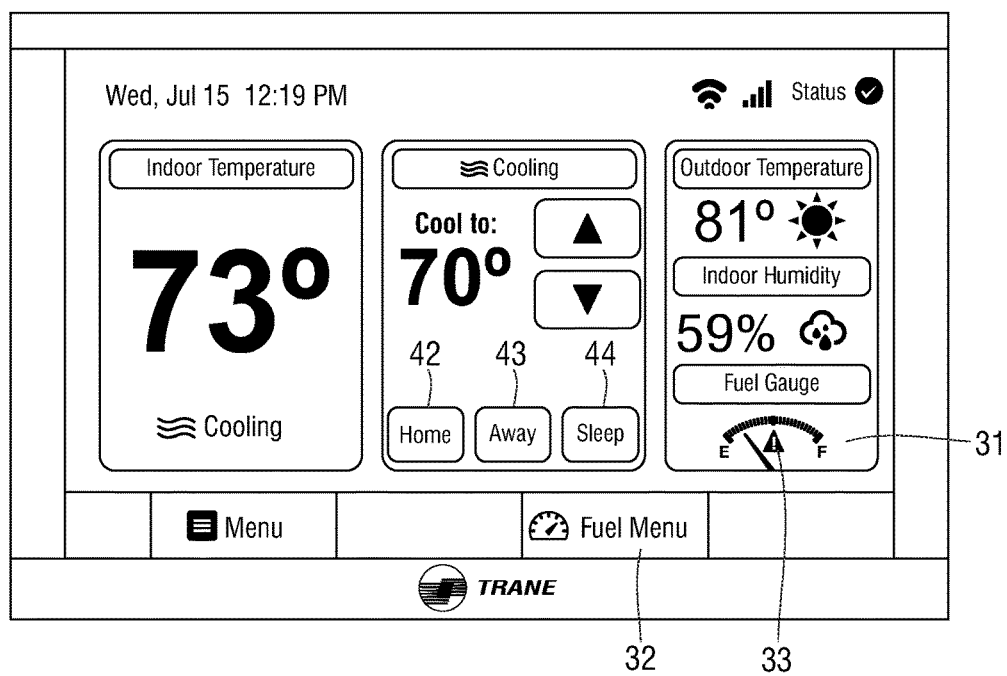
FIG. 2A illustrates another view of improved thermostat having a fuel gauge display in accordance with the present disclosure.
Figure 3:
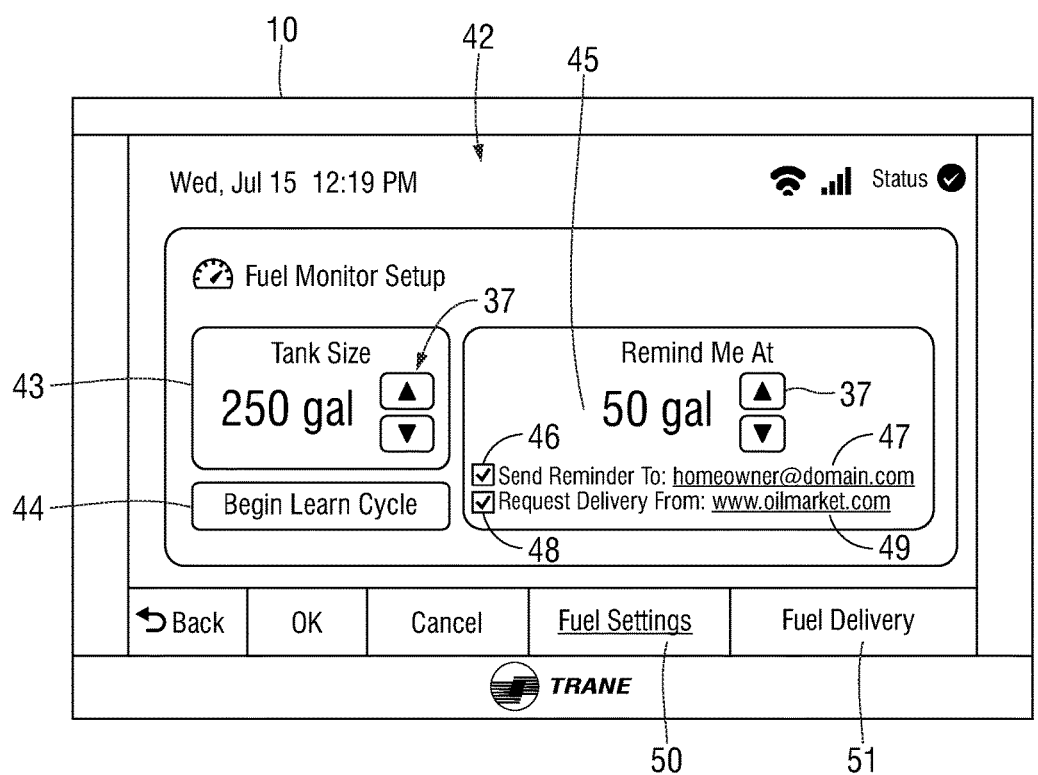
FIG. 3 illustrates the tank setup mode of an improved thermostat in accordance with the present disclosure.
Figure 4:
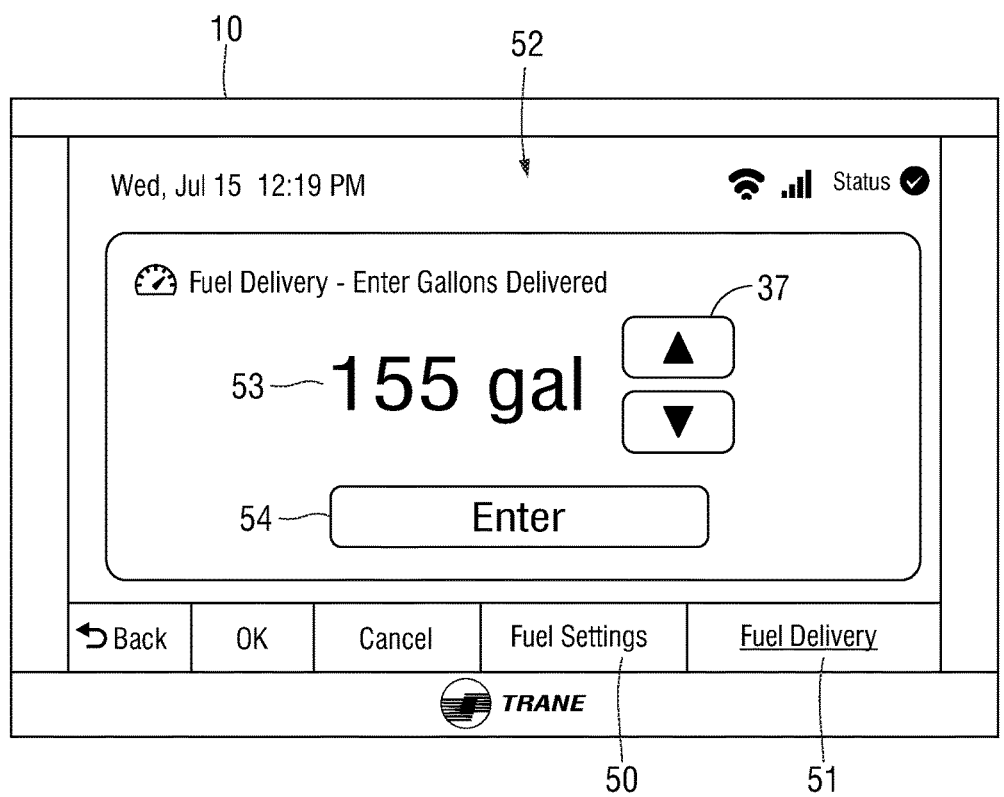
FIG. 4 illustrates a fuel delivery mode of an improved thermostat in accordance with the present disclosure.

Referring now to FIGS. 2 and 2A, thermostat 10 is shown in a home screen mode wherein an HVAC home screen user interface (UI) 30 having a plurality of user interface elements is displayed on touchscreen 12. Home screen UI 30 includes an indoor temperature display 34 and an operating mode indicator 35, which in the present example shows that HVAC system 1 is in cooling mode (A/C). Temperature setpoint display 36 shows the current target temperature which can be adjusted by a user using increment/decrement buttons 37. Home screen UI 30 includes an outdoor temperature display 38 and an indoor humidity display 39. A fuel menu navigation button 32 is provided to enable a user to enter fuel monitor setup UI 42 and/or fuel delivery UI 52 (FIGS. 3 and 4). Home screen UI 30 further includes one or more status icons 40 which indicate the status of communications links (e.g., status of data interface 14 and/or HVAC interface 16), signal strength, overall system health, and the like. A date and time indicator 41 is also provided.

Home screen UI 30 includes a fuel gauge display 31 which indicates the fuel level computed by fuel module 17. As depicted in FIG. 2, fuel gauge display 31 indicates that the fuel tank associated with HVAC system 1 is computed to be full. Turning to FIG. 2A, fuel gauge display 31 indicates that the fuel tank is near empty. In addition, a low fuel indicator 33 is displayed to indicate that the computed fuel level has gone below a reminder threshold. While in the example embodiments shown in FIGS. 2 and 2A fuel gauge display 31 is depicted as an analog-style gauge, it should be understood that fuel gauge display 31 may be depicted using any suitable indicator, including without limitation a bar graph, a numerical display (percentage, gallons, fractional, etc.) and so forth. Similarly, although low fuel indicator 33 is depicted as a caution icon, any suitable icon or indicator may be used, including without limitation changes in coloration of fuel gauge display 31 or of any other UI element of thermostat 10, animations, audio indicators, and the like. It should be noted that although the exemplary embodiments indicate fuel quantity in gallons, other units may be used as appropriate (liters, pounds, cubic feet, therms/CCF, etc.).

In the exemplary embodiment shown in FIGS. 3 and 4, a user may interact with fuel module 17 using fuel monitor setup UI 42 and fuel delivery UI 52 to enter fuel tank size, refill reminder threshold, to select reminder and automatic delivery options, to initiate a calibration cycle, to enter fuel delivery data, to conclude a calibration cycle, and to commence fuel monitoring. In more detail, fuel monitor setup UI 42 includes a tank size input 43 which enables a user to specify the amount of fuel storage capacity available on-site. A pair of increment/decrement buttons 37 are provided to enable the user to input tank size, and in some embodiments, other input methods such as scroll wheels, scrollbars, on-screen (virtual) keyboards, multiple choice of common tank sizes (e.g., 250, 285, 500 and 1,000 gals.), and the like may additionally or alternatively be employed. The user initiates a fuel calibration cycle by selecting the "begin learn cycle" button 44.

A reminder threshold input 45 enables the user to specify at which point a low fuel action is to be performed. In the present example embodiment, the user may select an email reminder by selecting a reminder enable checkbox 46 and entering the desired reminder address 47. Other types of reminder addresses, such as without limitation, text (SMS), Twitter® message, etc. can be utilized. Similarly, the user may specify that an automatic delivery request be issued by selecting delivery enable checkbox 48 and entering a fuel provider address 49. Fuel provider address may include a preselected fuel delivery service, a dealer portal, and/or a fuel marketplace in which a plurality of local fuel delivery services compete to fulfill the fuel delivery request based upon best terms (e.g., best price, best delivery time accommodation, best interest rate, etc.). An automatic delivery request may take the form of an email message, an XML message transmitted via, e.g., a SOAP or RESTful interface, or any other suitable format. Fuel monitor setup UI 42 includes a fuel settings navigation button 50 and a fuel delivery navigation button 51 to enable the user to navigate to the desired screens and settings.

Fuel delivery UI 52 (FIG. 4) enables a user to log fuel deliveries into the thermostat 10. The user enters the fuel quantity delivered 53 and selects the enter button 54 to register the entered quantity. In some embodiments, fuel quantity delivered may be automatically entered based upon receipt of a delivery message from a fuel delivery service (email, XML-based message, etc.) that includes an indication of the actual quantity of fuel delivered.

Figure 4A:
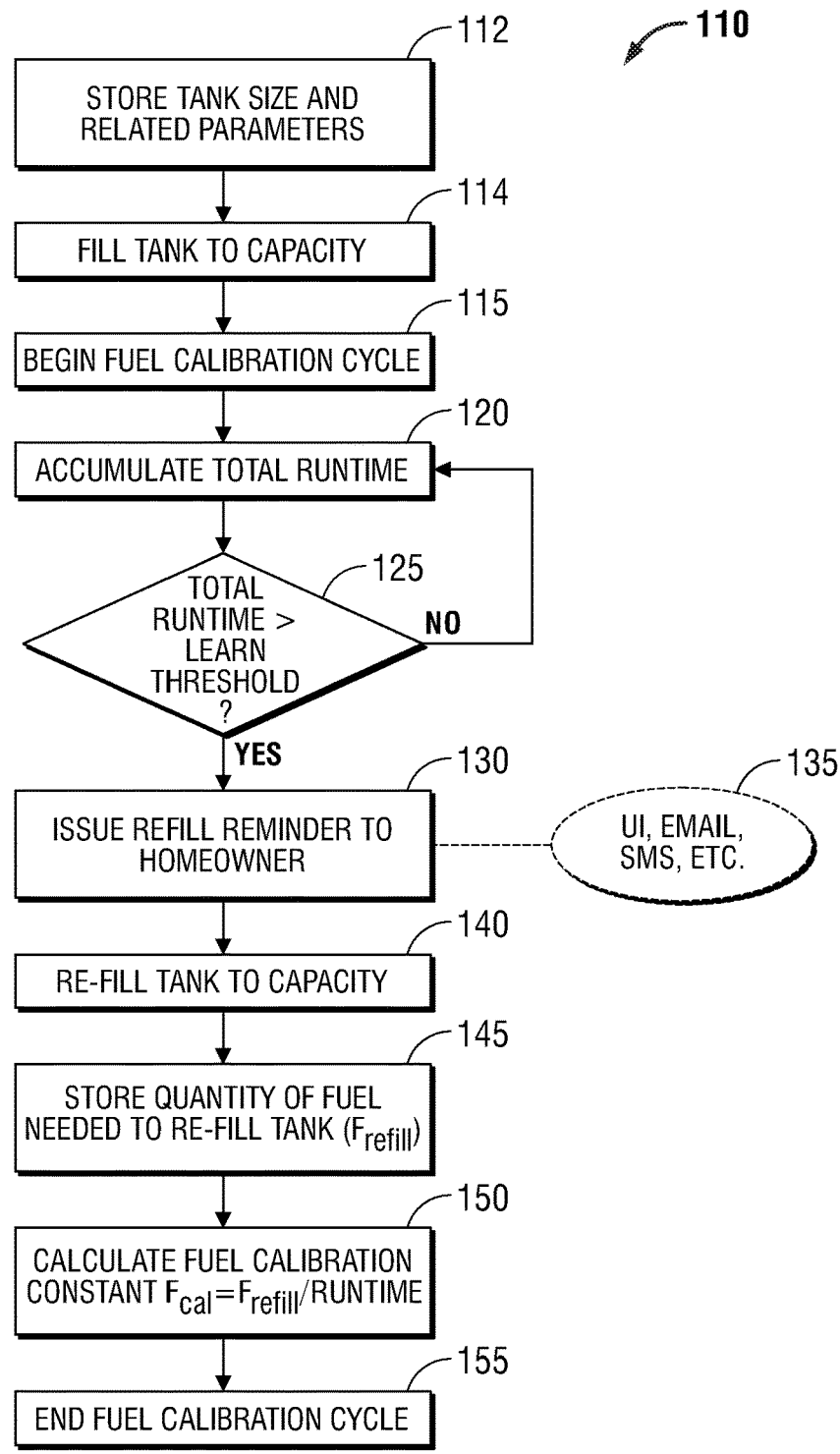
FIG. 4A is a flowchart illustrating a calibration cycle of a fuel module in accordance with the present disclosure.

The operation of a calibration cycle 110 of fuel module 17 is described with reference now to FIG. 4A. At block 112, tank size is received by fuel module 17 and stored in memory 13. Related parameters, such as a refill reminder threshold, a reminder activation flag, a reminder address, a deliver request activation flag, and/or a delivery request address are received by fuel module 17 and stored in memory 13. At block 114, tank 55 is topped off (e.g., filled to capacity or to a defined reference point) and in block 115, a fuel calibration cycle commences. In the present embodiment, a user presses "begin learn cycle" button 44 to initiate a fuel calibration cycle. A timestamp (e.g., date and time) marking the beginning of the calibration cycle may be stored in memory 13. Calibration cycle 110 runs concurrently with the normal operation of thermostat 10.

At block 120, fuel module 17 proceeds to accumulate the total run time of furnace 23 and/or auxiliary heater 28. That is, as thermostat 10 activates and deactivates furnace 23 and/or auxiliary heater 28 during operation to maintain the setpoint temperature, a running total of the actual elapsed time that furnace 23 and/or auxiliary heater 28 are running is maintained by fuel module 17. In multiple zone HVAC systems having a plurality of furnaces 23 and/or auxiliary heaters 28 which may be activated and deactivated at differing times, fuel module 17 maintains a combined running total for all such furnaces 23 and/or auxiliary heaters 28 in the system. In some embodiments where HVAC system includes a plurality of thermostats 10, one thermostat 10 may be designated as a master thermostat and the remainder thermostat(s) 10 may be designated as slave thermostats. In these embodiments, fuel module 17 of master thermostat 10 receives runtime data transmitted from the fuel module(s) 17 of the slave thermostat(s) and maintains a total elapsed runtime for all furnaces 23 and/or auxiliary heaters 28 in the system. In these embodiments, master thermostat 10 and the one or more slave thermostat(s) 10 communicate via their respective data interfaces 14 and/or HVAC interfaces 16.

At block 125, a test is performed to determine whether a sufficient calibration cycle has elapsed. In the present embodiment, a sufficient calibration cycle has elapsed when the total runtime exceeds a predetermined calibration runtime threshold, for example, 36 hours of runtime. In some embodiments, a sufficient calibration cycle has elapsed after the passage a fixed period of time from the start of the calibration cycle, e.g., one week, two weeks, etc. In some embodiments, the calibration runtime threshold and/or the fixed calibration time period may be determined at least in part upon the tank size received in block 112. This is helpful by enabling the calibration cycle to be extended for larger capacity tanks, thus providing a longer baseline period which may improve calibration accuracy and improve overall system performance.

In embodiments where fuel module 17 computes fuel use based upon a heating degree day (HDD) formula, block 125 may include a test to determine that a sufficient calibration cycle has elapsed when a predetermined number of heating degree days have accumulated.

Once it has been determined in block 125 that a sufficient calibration cycle has elapsed, in block 130 a reminder 135 is issued to the homeowner that it is time to schedule another fuel fill-up. The reminder may include, for example, a user interface notification 33 displayed on touchscreen 12, an email, an SMS message, a push notification sent to a homeowner's smartphone or tablet, and so forth. In block 140, fuel tank 55 is refilled to capacity (or to the defined reference point), and in block 145 the quantity of fuel delivered $f_{refill}$ (e.g., the amount of fuel necessary to top off tank 55) is received and stored. In block 150, a fuel calibration constant which represents the rate of fuel use is calculated in accordance with the formula $F_{cal}=f_{refill}/\text{Runtime}_{calibration}$ and stored.

Figure 4B:
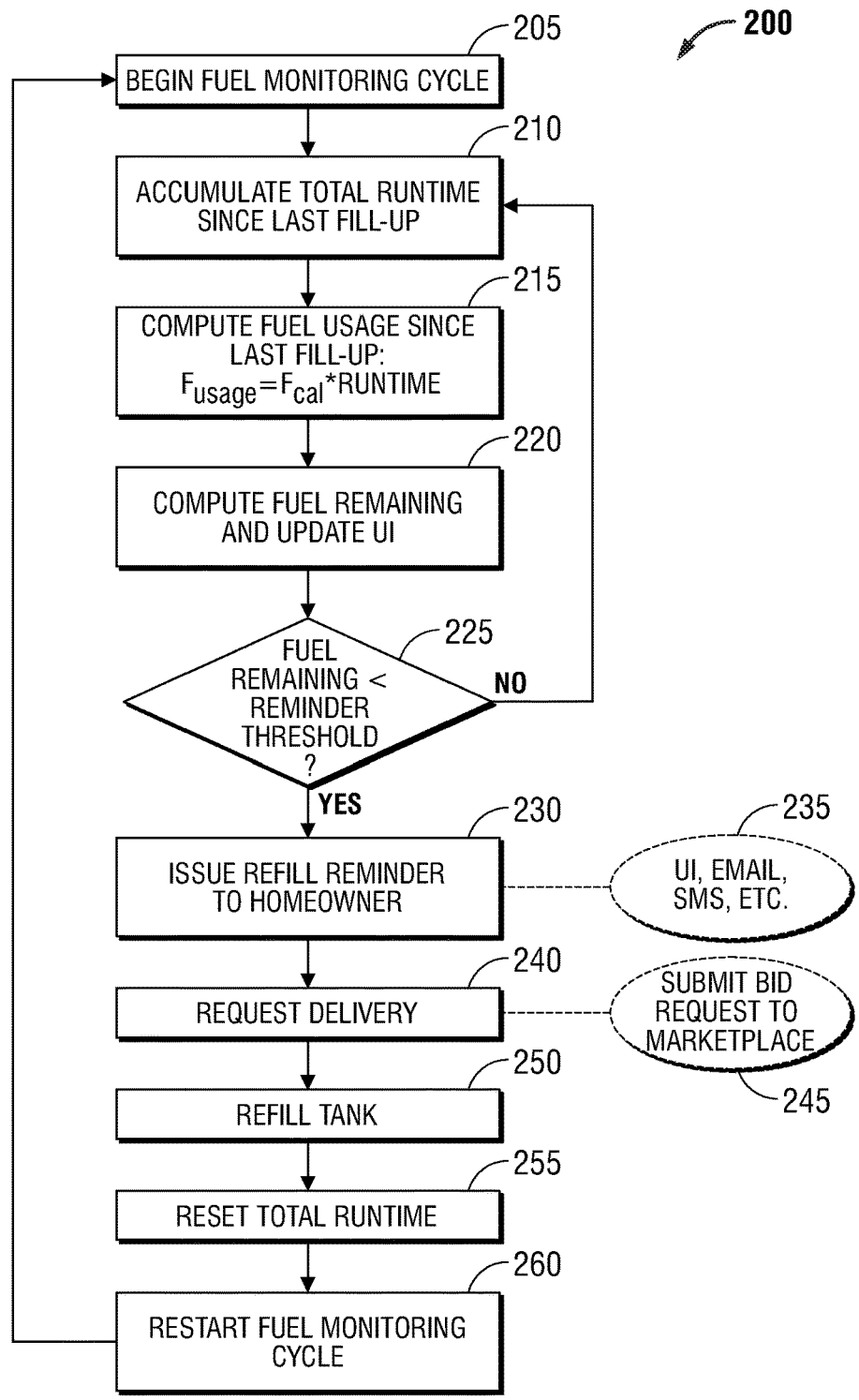
FIG. 4B is a flowchart illustrating a fuel monitoring cycle of a fuel module in accordance with the present disclosure.

Once the fuel delivery is received and entered, the calibration cycle 110 concludes with block 155 and, referring now to FIG. 4B, a fuel monitoring cycle 200 may commence with block 205 and runs concurrently with normal operation of thermostat 10. In block 210, the fuel module 17 proceeds to accumulate the total run time of furnace 23 and/or auxiliary heater 28. That is, as thermostat 10 activates and deactivates furnace 23 and/or auxiliary heater 28 during operation to maintain the setpoint temperature, a running total of the actual elapsed time that furnace 23 and/or auxiliary heater 28 has run since the last fuel delivery is maintained by fuel module 17. Run time may be accumulated in a substantially continuous manner during a heating cycle (while furnace 23 and/or auxiliary heater 28 is activated), may be updated periodically (e.g., every minute), and/or may be updated at the beginning and/or end of a heating cycle. In block 215 the amount of fuel used since the last fill-up is calculated using the formula $F_{usage}=F_{cal}*\text{Runtime}$ and in block 220 is subtracted from the tank capacity to determine the quantity of fuel $F_{remaining}$ remaining in tank 55 and fuel gage 31 is updated to reflect the current fuel level. In block 225, the quantity of fuel $F_{remaining}$ is compared to the refill reminder threshold and if $F_{remaining}$ has gone below the threshold, in block 230 a refill reminder 235 is issued to the homeowner that it is time to schedule another fuel fill-up. In embodiments where delivery requests are enabled, a delivery request 245 is generated and transmitted to a fuel provider to schedule a fill-up. In embodiments, a fuel bid request may be transmitted by the thermostat to a heating fuel marketplace where a fuel provider offering the best terms is selected to provide the next fuel delivery. In block 250, fuel tank 55 is refilled to capacity, and in block 255 the total runtime accumulator is reset (e.g., upon activation of fuel delivery entry button 54) and in block 260 the fuel monitoring cycle iterates.

In some embodiments, an initial fuel calibration constant may be employed to enable fuel monitoring cycle 200 to run concurrently with calibration cycle 110. The initial fuel calibration constant is determined based on the stated fuel consumption rate of furnace 23. For example, an oil-fired burner may have a known nozzle flow rate of 0.8 gal/hour. The initial fuel calibration constant is determined based on this fuel flow rate.

In embodiments, historical fuel use may be displayed to the homeowner. In these embodiments, degree day information may be combined with fuel use to determine and display overall home heating efficiency information to the homeowner. In embodiments, in addition to receiving a fuel fill-up quantity, fuel module 17 may receive the price paid for fuel (e.g., price per gallon, total price paid) which, in turn, may be used to compute and display fuel cost statistics to the homeowner.

Turning now to FIGS. 5-11, embodiments of an improved thermostat 10 having a mode control module 18 which provides a programmable set of feature modes are illustrated. The disclosed embodiments enable a user to customize the thermostat user interface (UI) as desired to provide extended functionality and more convenient, useful control of functions beyond conventional HVAC-related functions. Since HVAC control functions are generally performed based on predefined schedule, without much need for frequent changes to HVAC parameters, it is undesirable and, indeed, may be wasteful to display only HVAC controls on the home screen. Accordingly, embodiments of the present disclosure include a UI which presents those controls which are frequently used by the consumer while the broader set of HVAC control algorithms and functions run in the background.

Figure 5:
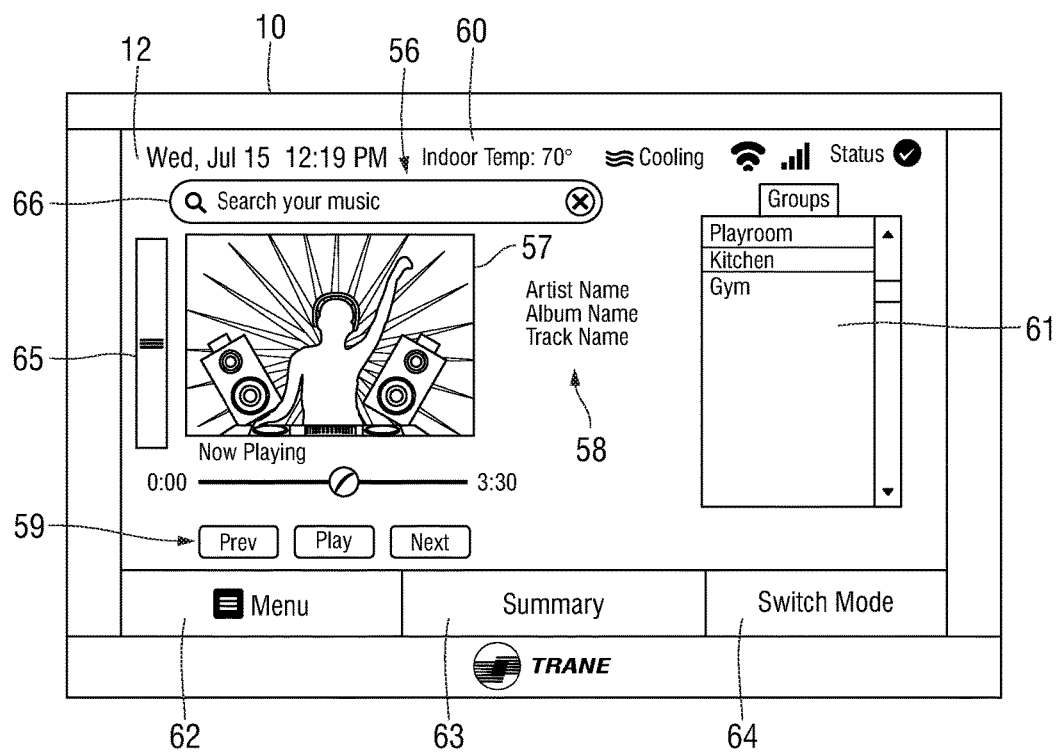
FIG. 5 illustrates a home screen of a media controller mode of an improved thermostat in accordance with the present disclosure.
Figure 11:
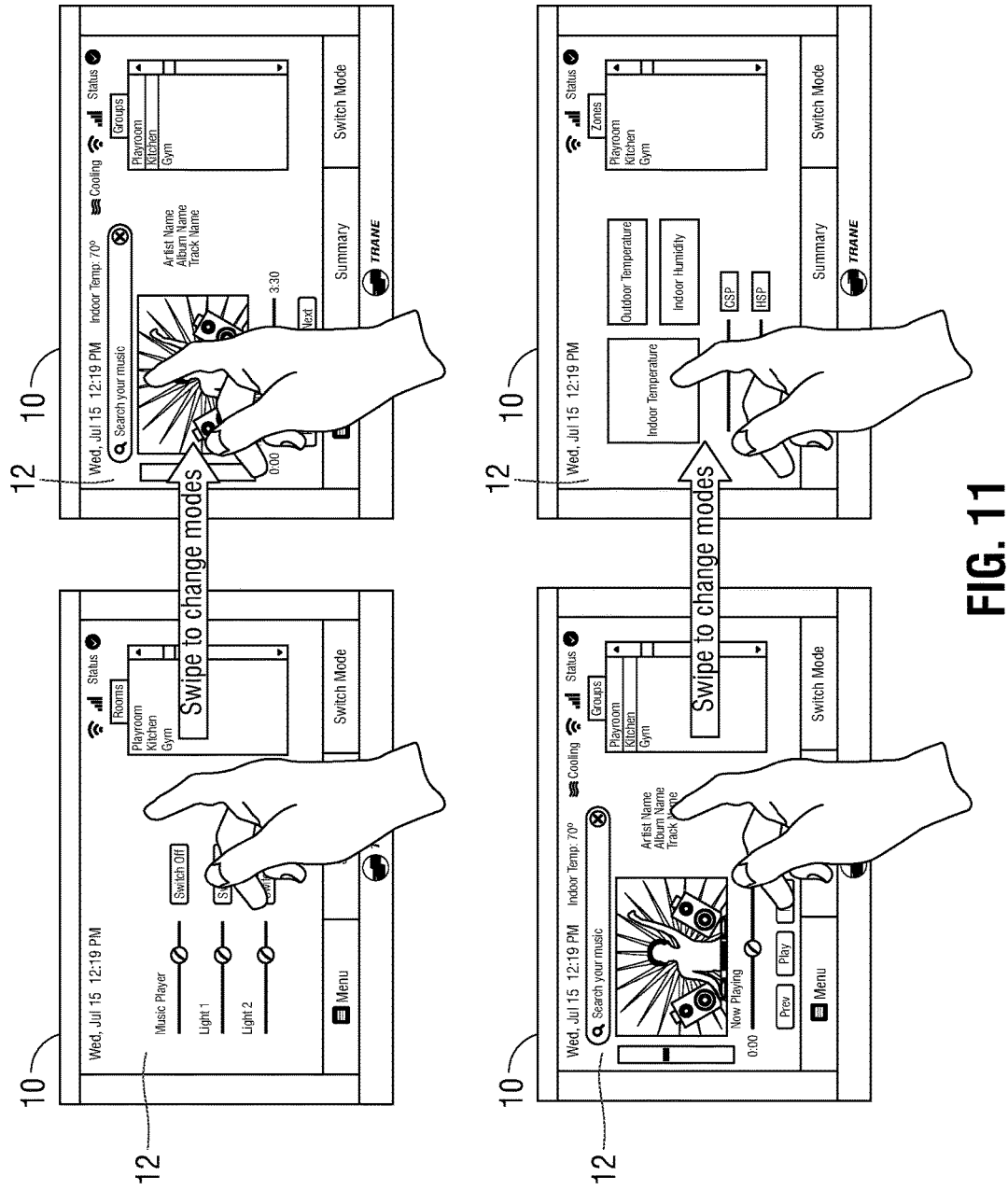
FIG. 11 illustrates use of a user interface swiping gesture to switch between modes of an improved thermostat in accordance with the present disclosure.

For example, FIG. 5 illustrates thermostat 10 that presents an embodiment of a music controller UI 56 as the default, e.g., home screen, display. Music controller UI 56 includes a number of UI elements which enable a user to control music playback in one or more playback zones. A zone selector 61 enables a user to select one or more playback zones to which music controller UI 56 inputs are to be applied. A playback zone may correspond to one or a predefined group of media devices 25. An album art display 57 and music metadata display 58 enable a user to view the information about currently-playing music. A set of playback controls 59 enable a user to start, stop, pause, and shuttle playback, and to select playback modes (e.g., repeat, shuffle, etc.). A volume control 65 enables a user to control the playback volume. A search bar 66 enables the user to search for and select music within a music library (e.g., an iTunes shared library, a shared folder, and the like), online streaming services (e.g., Pandora®, Slacker®, and the like). A minimized HVAC status display 60 enables a user to monitor HVAC parameters. Each of the supported modes may utilize HVAC status display 60 or additional or alternative common space for basic alerts and status messages from HVAC mode and/or other supported modes. A user may switch among and between other user interfaces, e.g., the HVAC home screen user interface (UI) 30, using the switch mode button 64 and/or by performing a swipe gesture as shown in FIG. 11.

Figure 6:
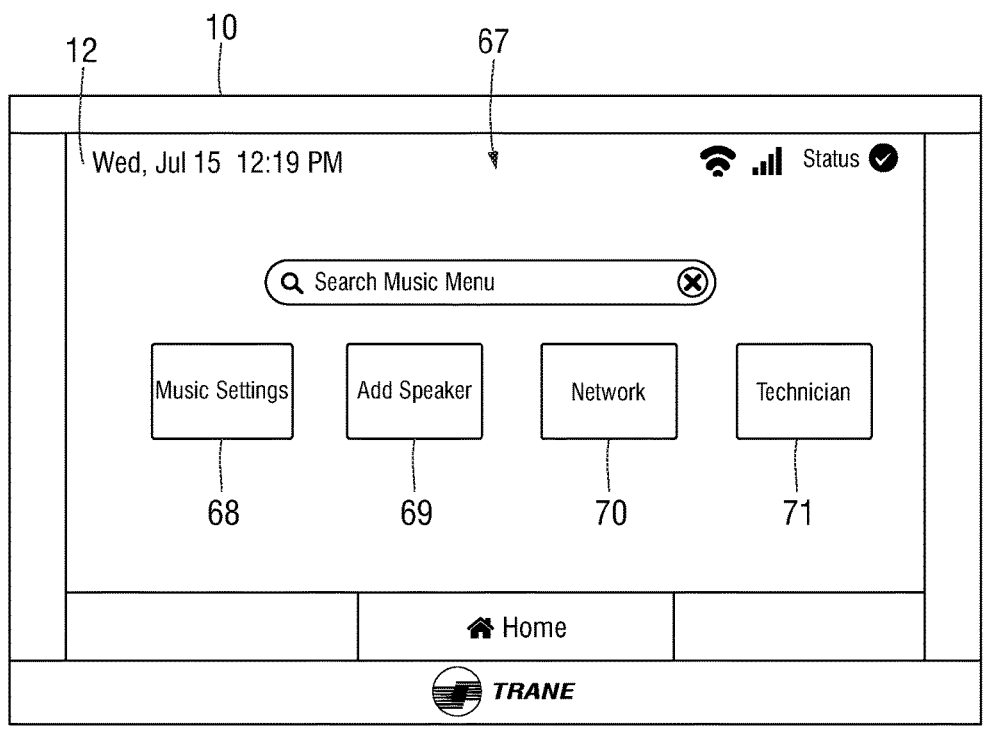
FIG. 6 illustrates a menu screen of a media controller mode of an improved thermostat in accordance with the present disclosure.

FIG. 6 illustrates an embodiment of a music mode configuration UI 67 which includes a number of elements which enable a user to configure thermostat 10 via a set of configuration submenus, for example, a music settings button 68, an add speaker button 69 (e.g., to enable the user to add or remove music playback zones), a network button 70 which enables a user to access network settings, and a technician button 71 which enables a user to obtain service provider contact information and/or to contact a service provider.

Figure 7:
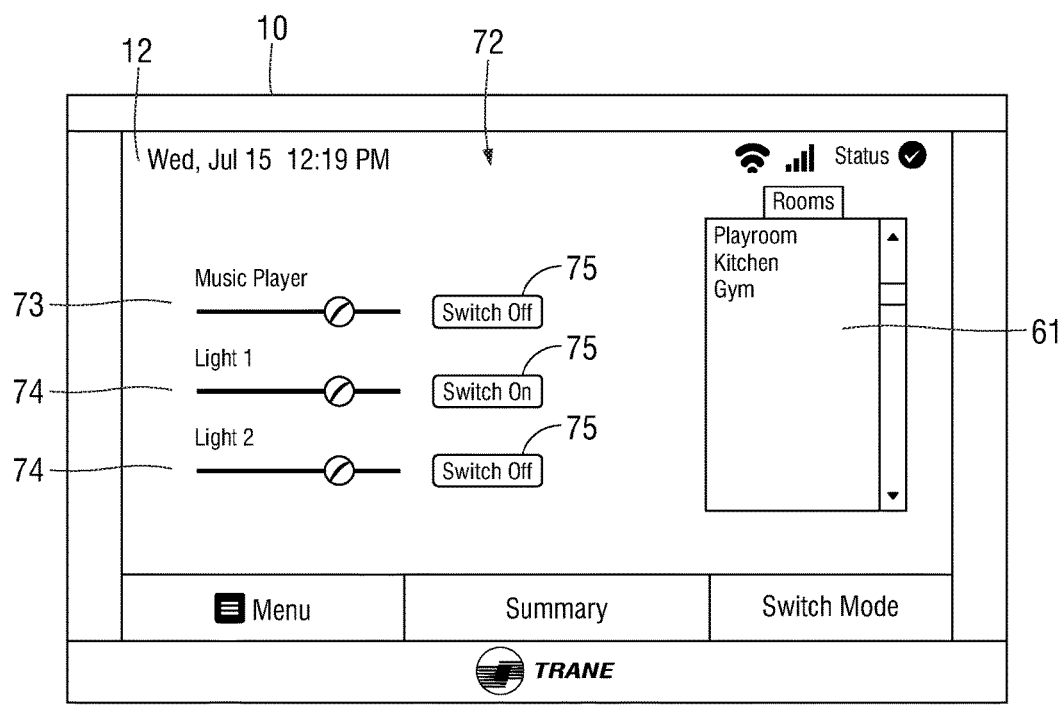
FIG. 7 illustrates a home screen of a home automation mode of an improved thermostat in accordance with the present disclosure.

FIG. 7 illustrates an embodiment of a home automation UI 72 which enables a user to control one or more home automation devices 24. Additionally or alternatively, home automation UI 72 enables a user to control one or more media devices 24 and/or security devices 29. In the exemplary embodiment shown in FIG. 7, home automation UI 72 includes a music player volume control 73, a lighting dimmer control 74, and one or more on/off toggle buttons that are associated with music player volume control 73 and/or lighting dimmer control 74. Other UI elements may be included as appropriate to control other types of home automation devices, such as without limitation window treatment raise/lower controls, skylight open/close controls, irrigation system controls (sprinkler zone on/off, zone scheduling parameters, even/odd day scheduling, water conservation mode on/off, etc.).

Figure 8:
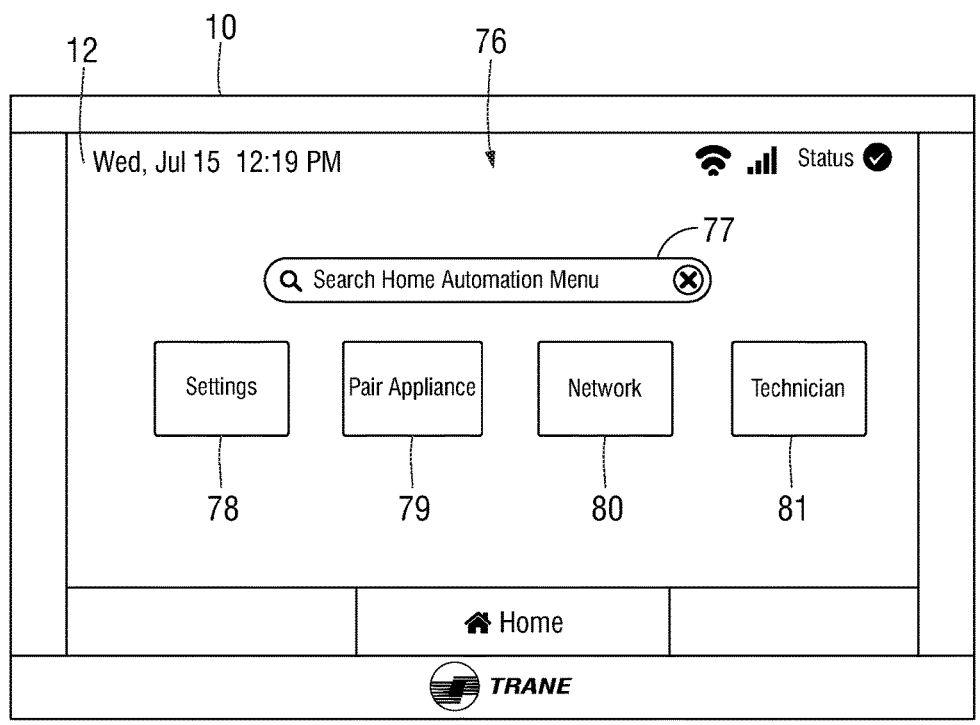
FIG. 8 illustrates a menu screen of a home automation mode of an improved thermostat in accordance with the present disclosure.

FIG. 8 illustrates an embodiment of a home automation mode configuration UI 76 which includes a number of elements which enable a user to configure thermostat 10 via a set of configuration submenus, for example, a home automation settings button 78, a pair appliance button 79 (e.g., to enable the user to pair a home automation device 24 with thermostat 10), a network button 80 and a technician button 81. A home automation device search bar 77 enables a user to identify and select home automation devices 24 which are able to be paired and/or otherwise configurable for use with thermostat 10.

Figure 9:
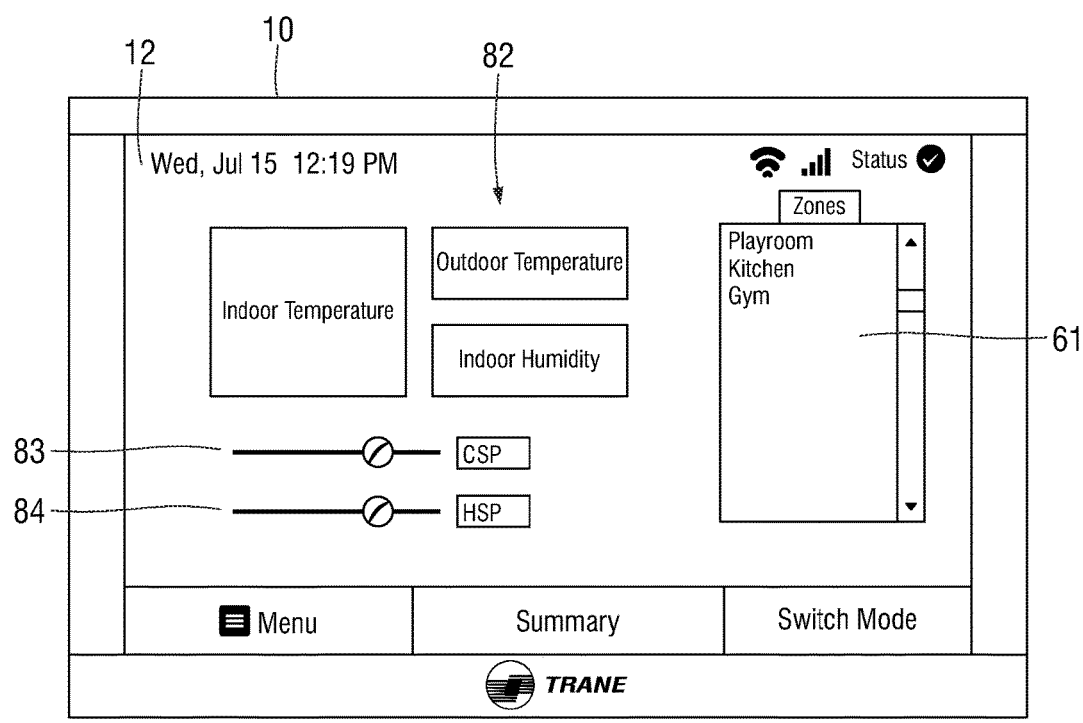
FIG. 9 illustrates a home screen of an HVAC control mode of an improved thermostat in accordance with the present disclosure.

FIG. 9 illustrates an embodiment of an alternative HVAC home screen UI 82 which enables multiple HVAC zone control via zone selector 61. In these embodiments, multiple thermostats 10 communicate via data interface 14 in a master-slave relationship and/or in a peer-to-peer relationship to effectuate the HVAC settings. HVAC home screen UI 82 includes continuous slider controls for setting HVAC setpoint, such as cooling setpoint slider 83 and a heating setpoint slider 84.

Figure 10:
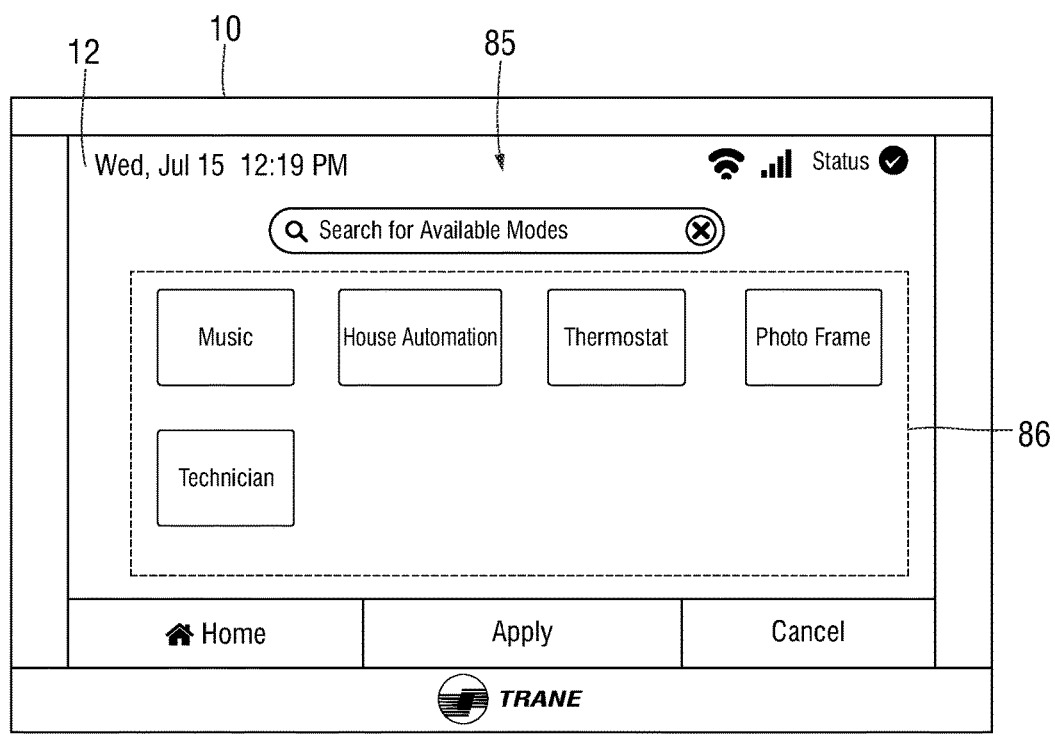
FIG. 10 illustrates a user interface selection mode of an improved thermostat in accordance with the present disclosure.

FIG. 10 illustrates an embodiment of a mode control configuration UI 85 which enables a user to configure which mode UIs are displayed and the order in which they are revealed when a user navigates between modes. Mode control configuration UI 85 includes one or more mode configuration buttons 86, each of which represent a particular mode UI. When pressed, a mode configuration button 86 enables a user to select whether the associated UI mode should be displayed (e.g., whether the user wishes to use the music controller UI 56, home automation UI 72, etc.). In embodiments, one or more mode configuration buttons 86 may be rearranged in any desired order by the user by, for example, a press/hold and drag gesture, to create a desired user selection of the preferred order of user interfaces. In embodiments, new or updated UI mode may be selectively downloaded to mode control module 18, from for example, a remote device 27 which provides downloadable UI content. For example, a UI which supports the scheduling of digital video recorder (DVR) recordings may be downloaded by a user where this feature is provided by the user's local cable television provider. Other UIs, such as, for example, a weather UI, photo frame UI, text or instant messaging UI may be provided. As shown in FIG. 11, thermostat 10 provides a user the ability to seamlessly move between various feature modes by performing a swipe gesture on touch screen 12.

Figure 12:
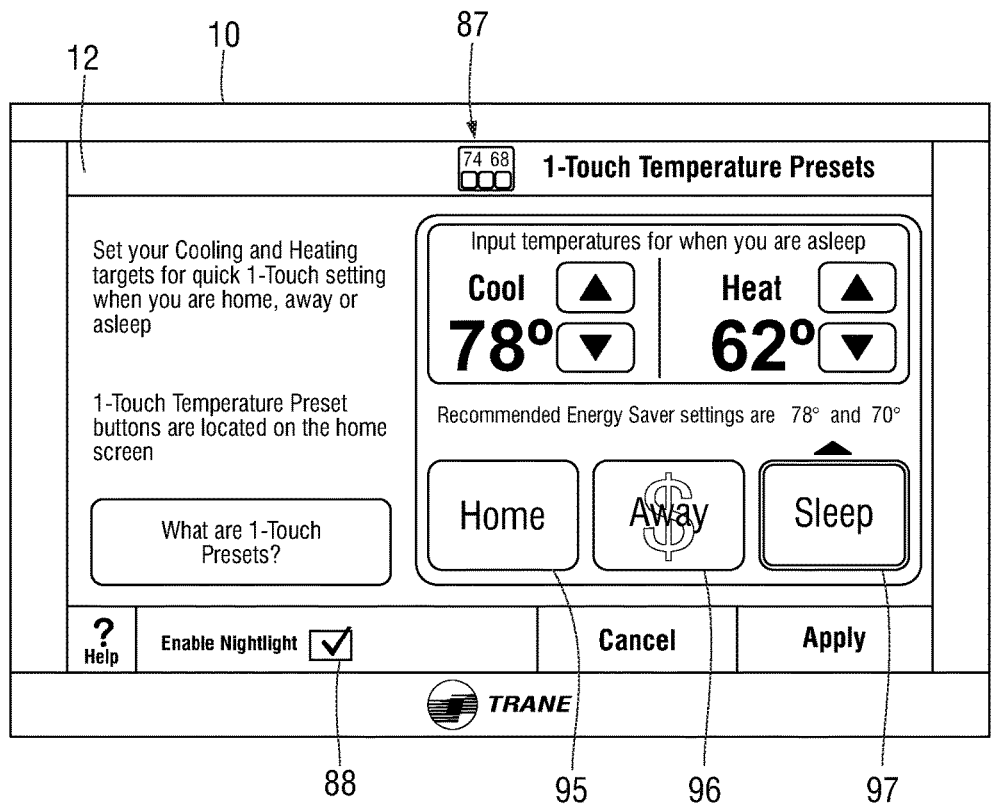
FIG. 12 illustrates a nightlight enabling feature of an improved thermostat in accordance with an embodiment of the present disclosure.
Figure 13:
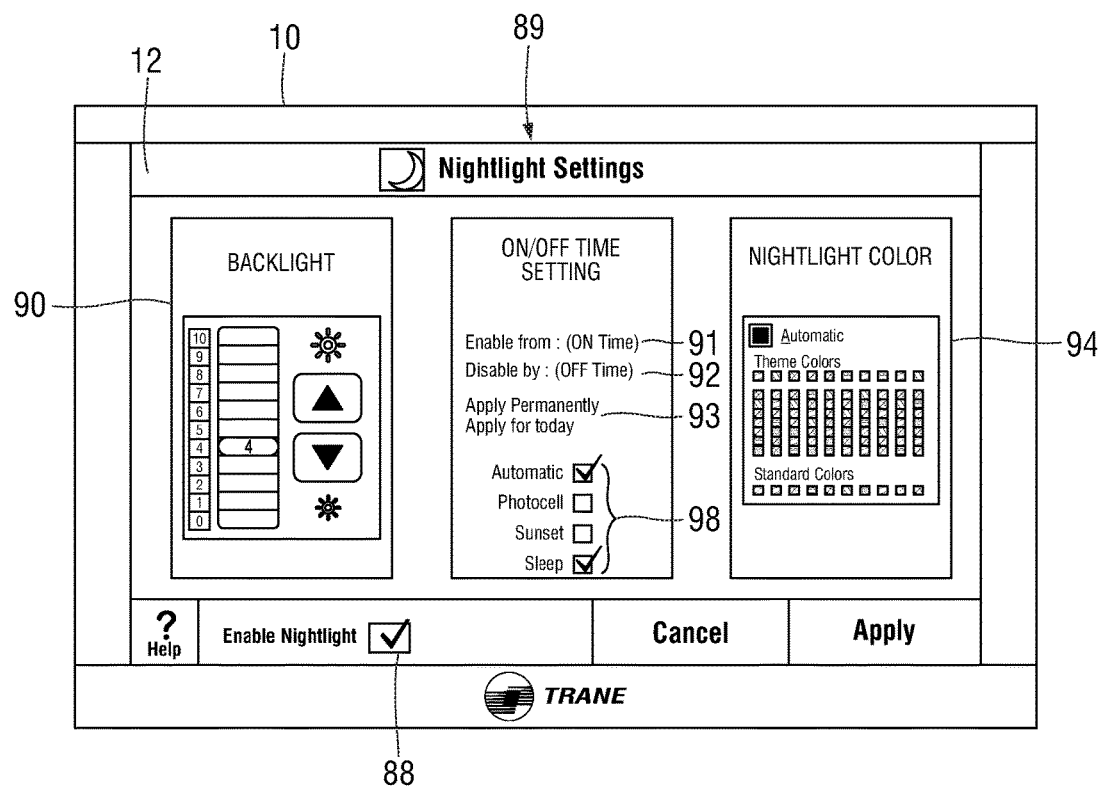
FIG. 13 illustrates a nightlight parameter setting mode of an improved thermostat in accordance with an embodiment of the present disclosure.
Figure 14:
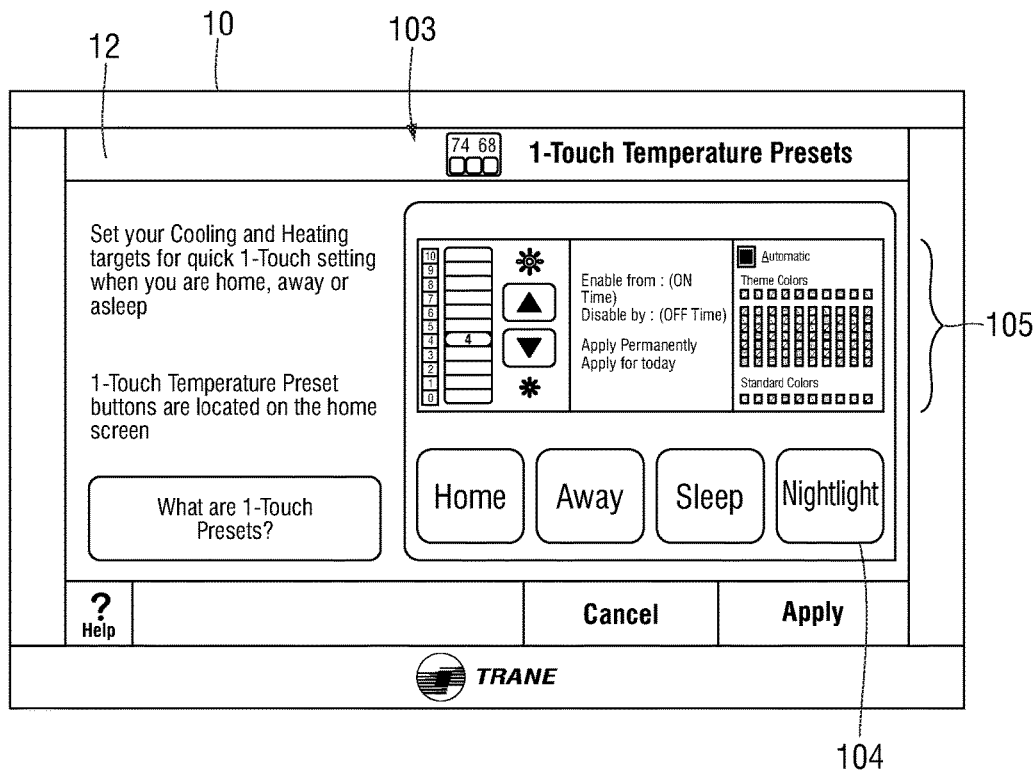
FIG. 14 illustrates another nightlight parameter setting mode of an improved thermostat in accordance with an embodiment of the present disclosure.

Turning now to FIGS. 12-14, exemplary embodiments of an improved thermostat 10 having a nightlight module 19 are illustrated. Nightlight module 19 is configured to control operational aspects of touchscreen 12 in accordance with user settings to illuminate the backlight 101 of touchscreen 12 during nightlight mode. As shown in FIG. 12, thermostat 10 includes a one-touch UI 87 having a number of user-configurable "one-touch" temperature presets from which the user may select by activating, for example, a home button 95, an away button 96, or a sleep button 97. In a typical scenario, a user could select home button 95 when the user arrives home or wakes up in the morning. Away button 96 could be selected when the last person leaves the home, and sleep button 97 could be selected as the last person goes to bed. An enable nightlight checkbox 88 is provided to allow a user to specify whether the nightlight function should be activated during sleep mode. That is, when a user selects the sleep button 97, nightlight module 19 determines whether the enable nightlight checkbox 88 is checked, and if it is checked, activates backlight 101 of touchscreen 12 in nightlight mode accordance with the current nightlight settings.

Note that while the present embodiment utilizes backlight 101 as a source of nightlight illumination, in some embodiments where touchscreen 12 includes an emissive display, nightlight illumination may be provided by the emissive elements of touchscreen 12.

Turning now to FIG. 13, thermostat 10 includes a nightlight settings UI 89 having a number of elements configured to enable a user to customize operational aspects of nightlight module 19. Nightlight intensity slider 90 enables a user to control the brightness of touchscreen 12 during nightlight mode. Nightlight color chooser 94 enables a user to specify the desired color of touchscreen 12 during nightlight mode. While in the illustrated embodiment a user may select from a palette of predetermined colors, in some embodiments the user may select any color available in the colorspace of touchscreen 12 (e.g., via RGB color circle, individual RGB sliders, and the like). Nightlight settings UI 89 includes settings related to activation and deactivation of nightlight mode. A user may specify a predetermined nightlight "on" time and "off" time using nightlight on time selector 91 and nightlight off time selector 92, respectively. Settings options 93 may be defined by a user, for example, whether the entered nightlight settings are to be applied for an ongoing (permanent) or one-time (temporary) basis. An automatic mode checkbox 98 enables a user to specify that nightlight mode is to be activated automatically, e.g., based upon detection by sensor 15 of a low ambient light level, based upon sunset/sunrise times, and/or based on activation of sleep mode by a user. The entered settings are communicated by touchscreen 12 to nightlight module 19 and stored in memory 13.

Referring back to FIG. 1, in some embodiments, thermostat 10 includes auxiliary nightlight connector 99 that is configured for selective engagement with an auxiliary nightlight module 100. Auxiliary nightlight module 100 includes one or more light emitting elements 102, such as LEDs, that are illuminated additionally or alternatively to backlight 101 during nightlight mode. These embodiments may be useful where the nightlight illumination provided by touchscreen 12 alone is insufficient, for example, in large rooms, where vision-impaired persons may dwell, in darkly-furnished hallways, and so forth. In embodiments, light emitting elements 102 include variable color (RGB) LEDs whose color is set in accordance with nightlight color chooser 94.

FIG. 14 illustrates another embodiment of a thermostat 10 having a combined nightlight UI 103 that includes a nightlight settings selector 104 which, when chosen by a user, presents the user with a number of nightlight settings 105 substantially as described hereinabove.

Figure 15:
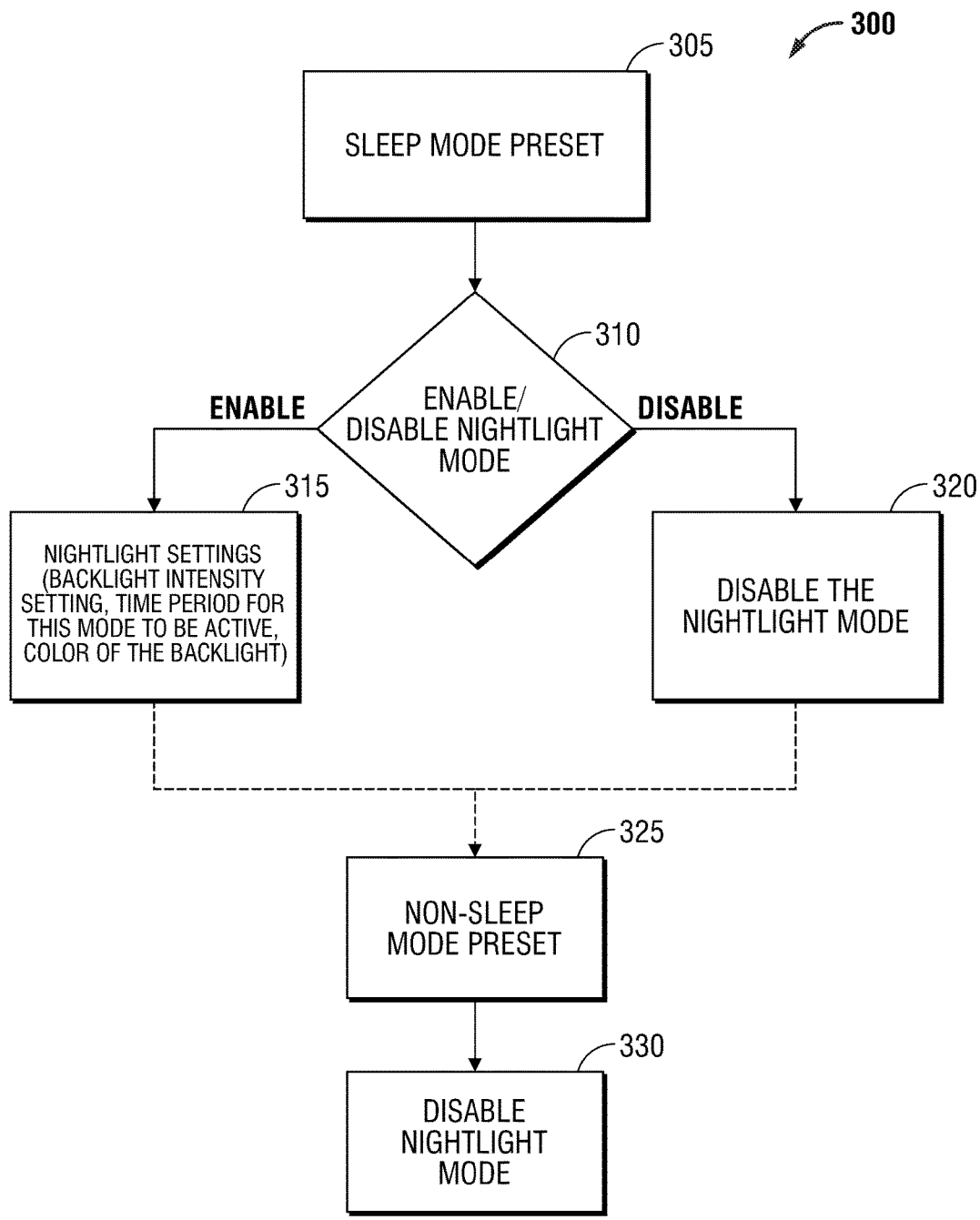
FIG. 15 is a flowchart illustrating operation of a nightlight module in accordance with an embodiment of the present disclosure.

The operation of an operating cycle 300 of nightlight module 19 is described with reference now to FIG. 15. In block 305 a user has selected a sleep mode preset button 97 which places thermostat 10 in sleep mode which, in turn, activates the designated setpoint temperature for sleep mode. In block 310, a test is performed to determine whether nightlight mode is enabled (e.g., whether checkbox 88 checked). If nightlight mode is enabled, in block 315 the touchscreen 12 is illuminated in accordance with the designated nightlight parameters (e.g., intensity, color). Conversely, if nightlight mode is not enabled, in block 320 the touchscreen 12 illumination is extinguished. In block 325, when thermostat 10 exits sleep mode (e.g., by a user selecting a home mode, an away mode, and/or upon a scheduled sleep exit event) or upon a scheduled nightlight off event, the block 330 is performed wherein the touchscreen 12 illumination is extinguished.

ASPECTS

It is noted that any of aspects 1-9, any of aspects 10-14, any of aspects 15-18 and/or aspect 19 may be combined with each other in any combination.

Aspect 1. An improved HVAC thermostat for an HVAC system having an on-site fuel supply, comprising a touchscreen display; and a fuel control module configured for estimating a rate of fuel usage by the HVAC system and for issuing an alert when the on-site fuel supply drops beneath a predetermined level.

Aspect 2. The improved HVAC thermostat in accordance with aspect 1, wherein the fuel control module estimates a rate of fuel usage by performing a fuel calibration cycle to determine a fuel calibration constant.

Aspect 3. The improved HVAC thermostat in accordance with any of aspects 1-2, wherein the fuel calibration constant is the amount fuel used per unit of run time.

Aspect 4. The improved HVAC thermostat in accordance with any of aspects 1-3, wherein the fuel calibration constant is the amount fuel used per heating degree day.

Aspect 5. The improved HVAC thermostat in accordance with any of aspects 1-4, wherein the fuel control module is further configured for transmitting a fuel delivery request when the on-site fuel supply drops beneath a predetermined level.

Aspect 6. The improved HVAC thermostat in accordance with any of aspects 1-5, wherein the fuel control module is further configured to receive a user input, and/or receive a fuel delivery message from a fuel provider, that indicates a quantity of fuel added to the on-site fuel supply.

Aspect 7. The improved HVAC thermostat in accordance with any of aspects 1-6, wherein the touchscreen display includes a fuel gauge indicative of a fuel level of the on-site fuel supply.

Aspect 8. The improved HVAC thermostat in accordance with any of aspects 1-7, wherein the fuel control module is further configured for transmitting a fuel delivery bid request to an online marketplace when the on-site fuel supply drops beneath a predetermined level; receiving at least one fuel delivery bid from a fuel delivery provider; selecting a winning bid from among the at least one fuel delivery bid; and transmitting a fuel delivery request to the fuel delivery provider corresponding to the winning bid.

Aspect 9. The improved HVAC thermostat in accordance with any of aspects 1-8, wherein the fuel delivery bid includes terms selected from a fuel price, a delivery time window, and a discount rate.

Aspect 10. An improved HVAC thermostat, comprising a sensor selected from a group consisting of an ambient light detector and a proximity sensor; an illuminated touchscreen display; and a nightlight module configured to illuminate the touchscreen in accordance with at least one nightlight parameter selected from the group consisting of an activation event, a deactivation event, an illumination intensity, and an illumination color.

Aspect 11. The improved HVAC thermostat in accordance with aspect 10, wherein the activation event includes activation of a sleep mode, reaching a scheduled start time, detection of ambient light by the ambient light sensor falling below a predetermined level, and/or the detection of an object by the proximity sensor.

Aspect 12. The improved HVAC thermostat in accordance with any of aspects 10-11, wherein the scheduled start time is determined at least in part with respect to the time of sunset.

Aspect 13. The improved HVAC thermostat in accordance with any of aspects 10-12, further comprising an auxiliary nightlight connector that is configured for selective engagement with an auxiliary nightlight module and wherein the nightlight module is further configured to illuminate the auxiliary nightlight module in accordance with at least one nightlight parameter.

Aspect 14. The improved HVAC thermostat in accordance with any of aspects 10-13, wherein the deactivation event includes activation of a non-sleep mode, reaching a scheduled end time, detection of ambient light by the ambient light sensor rising above a predetermined level, and/or the detection of no object by the proximity sensor.

Aspect 15. An improved HVAC thermostat, comprising a touchscreen display; and a mode control module configured for selecting, for display on the touchscreen display, a primary user interface from among a plurality of potential user interfaces based at least in part upon the frequency of use of each of the plurality of potential user interfaces.

Aspect 16. The improved HVAC thermostat in accordance with aspect 15, wherein the mode control module is further configured to select at least one secondary user interface from among a plurality of potential user interfaces based at least in part upon the frequency of use of each of the plurality of potential user interfaces, and/or a user selection.

Aspect 17. The improved HVAC thermostat in accordance with any of aspects 15-16, wherein the plurality of potential user interfaces are selected from a group consisting of a media mode user interface, a home automation mode user interface, and a security mode user interface.

Aspect 18. The improved HVAC thermostat in accordance with any of aspects 15-17, wherein the mode control module is further configured to select from among a plurality of potential user interfaces, for display on the touchscreen display, in response to a swipe gesture performed on the touchscreen display.

Aspect 20. Non-transitory computer-readable media, which, when executed on a processor included in a thermostat, cause the thermostat to perform any one, some, or all of the processes substantially as described herein.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. An HVAC thermostat with fuel control for an HVAC system having an on-site fuel supply, comprising:
   a touchscreen display; and
   a processor and a memory unit; and
   a database in communication with the HVAC system for storing information related to the on-site fuel supply;
   wherein the memory unit stores a fuel control module, and
   wherein the processor in communication with the memory unit and HVAC thermostat, is configured to cause the fuel control module to:
   determine a time when the on-site fuel supply was refilled;
   determine runtime data indicative of an aggregate runtime of the HVAC system since the time;
   determine, as a function of the runtime data, an aggregate amount of fuel used since the time;
   determine, as a function of the aggregate amount, a current fuel level of the on-site fuel supply; and
   issue an alert when the current fuel level is below a predetermined level.

2. The HVAC thermostat with fuel control in accordance with claim 1, wherein the processor executing the fuel control module estimates a rate of fuel usage by performing a fuel calibration cycle to determine a fuel calibration constant.

3. The HVAC thermostat with fuel control in accordance with claim 2, wherein the fuel calibration constant is determined to represent an amount of fuel used per unit of run time.

4. The HVAC thermostat with fuel control in accordance with claim 2, wherein the fuel calibration constant is determined to represent an amount of fuel used per heating degree day.

5. The HVAC thermostat with fuel control in accordance with claim 1, wherein the processor executing the fuel control module is further configured to:
   transmit a fuel delivery bid request to an online marketplace when the current fuel level is below the predetermined level;
   receive at least one fuel delivery bid from a fuel delivery provider;
   select a winning bid from among the at least one fuel delivery bid;
   transmit a fuel delivery request to the fuel delivery provider corresponding to the winning bid, wherein the fuel delivery bid includes terms selected from a fuel price, a delivery time window, and a discount rate; and
   receive a fuel delivery message that indicates a quantity of fuel added to the on-site fuel supply.

6. The HVAC thermostat with fuel control in accordance with claim 5, wherein the processor executing the fuel control module is further configured to receive the fuel delivery message from a user input indicative of a quantity of fuel added to the on-site fuel supply.

7. The HVAC thermostat with fuel control in accordance with claim 5, wherein the processor executing the fuel control module is further configured to receive the fuel delivery message from a fuel delivery provider that indicates a quantity of fuel added to the on-site fuel supply.

8. The HVAC thermostat with fuel control in accordance with claim 1, wherein the touchscreen display includes a fuel gauge indicative of the current level.

9. The HVAC thermostat with fuel control in accordance with claim 1, wherein the aggregate amount of fuel used since the time is determined as a function of the runtime data and a fuel calibration constant.

10. The HVAC thermostat with fuel control in accordance with claim 9, wherein the fuel calibration constant is determined as a function of a quantity of fuel used to refill the on-site fuel supply.

* * * * *